US010382754B2

(12) United States Patent
Li et al.

(10) Patent No.: US 10,382,754 B2
(45) Date of Patent: Aug. 13, 2019

(54) ENCODER-SIDE DECISIONS FOR SAMPLE ADAPTIVE OFFSET FILTERING

(71) Applicant: Microsoft Technology Licensing, LLC, Redmond, WA (US)

(72) Inventors: Bin Li, Beijing (CN); You Zhou, Sammamish, WA (US); Jizheng Xu, Beijing (CN); Chih-Lung Lin, Redmond, WA (US); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 15/307,746

(22) PCT Filed: Apr. 29, 2014

(86) PCT No.: PCT/CN2014/076446
§ 371 (c)(1),
(2) Date: Oct. 28, 2016

(87) PCT Pub. No.: WO2015/165030
PCT Pub. Date: Nov. 5, 2015

(65) Prior Publication Data
US 2017/0054976 A1 Feb. 23, 2017

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/14* (2014.11);
(Continued)

(58) Field of Classification Search
CPC ..... H04N 19/117; H04N 19/132; H04N 19/17
(Continued)

(56) References Cited

U.S. PATENT DOCUMENTS 8,923,407 B2  12/2014  Sze et al.
9,300,982 B2   3/2016  Park et al.
(Continued)

FOREIGN PATENT DOCUMENTS

CN  103379319  10/2013
CN  103442238  12/2013
(Continued)

OTHER PUBLICATIONS

Communication pursuant to Article 94(3) EPC dated May 9, 2017, from European Patent Application No. 14890721.5, 7 pp.
(Continued)

*Primary Examiner* — Jeffery A Williams
(74) *Attorney, Agent, or Firm* — Klarquist Sparkman, LLP

(57) ABSTRACT

Disclosed herein are exemplary embodiments of innovations in the area of encoding pictures or portions of pictures (e.g., slices, coding tree units, or coding units) and determining whether and how certain filtering operation should be performed and flagged for performance by the decoder in the bitstream. In particular examples, various implementations for setting the sample adaptive offset (SAO) syntax elements in the H.265/HEVC standard are disclosed. Although these examples concern the H.265/HEVC standard and its SAO filter, the disclosed technology is more widely applicable to other video codecs that involve filtering operations (particularly multi-stage filtering operations) as part of their encoding and decoding processes.

13 Claims, 13 Drawing Sheets

(51) Int. Cl.
  H04N 19/70    (2014.01)
  H04N 19/172   (2014.01)
  H04N 19/14    (2014.01)
  H04N 19/157   (2014.01)
  H04N 19/86    (2014.01)
  H04N 19/82    (2014.01)
  H04N 19/169   (2014.01)

(52) U.S. Cl.
  CPC ......... *H04N 19/157* (2014.11); *H04N 19/172* (2014.11); *H04N 19/1883* (2014.11); *H04N 19/70* (2014.11); *H04N 19/82* (2014.11); *H04N 19/86* (2014.11)

(58) Field of Classification Search
  USPC ..................................................... 375/240.29
  See application file for complete search history.

(56) References Cited

U.S. PATENT DOCUMENTS

| | | | |
|---|---|---|---|
| 9,451,252 | B2 | 9/2016 | Chen et al. |
| 2012/0163473 | A1 | 6/2012 | Laroche et al. |
| 2013/0051455 | A1* | 2/2013 | Sze ........................ H04N 19/70 375/240.02 |
| 2013/0094569 | A1 | 4/2013 | Chong et al. |
| 2013/0113880 | A1 | 5/2013 | Zhao et al. |
| 2013/0177068 | A1 | 7/2013 | Minoo et al. |
| 2013/0182759 | A1 | 7/2013 | Kim et al. |
| 2013/0223542 | A1 | 8/2013 | Kim et al. |
| 2013/0266058 | A1 | 10/2013 | Minoo et al. |
| 2013/0266059 | A1 | 10/2013 | Chong et al. |
| 2014/0003491 | A1 | 1/2014 | Chen et al. |
| 2014/0036991 | A1 | 2/2014 | Chao et al. |
| 2014/0119433 | A1* | 5/2014 | Park ........................ H04N 19/44 375/240.02 |
| 2014/0146894 | A1 | 5/2014 | Yu et al. |
| 2014/0192869 | A1 | 7/2014 | Laroche et al. |
| 2014/0192892 | A1 | 7/2014 | Van der Auwera et al. |
| 2014/0314141 | A1* | 10/2014 | Choi .................... H04N 19/463 375/240.02 |
| 2014/0369429 | A1 | 12/2014 | Laroche et al. |
| 2015/0350650 | A1 | 12/2015 | Kim et al. |
| 2016/0105675 | A1 | 4/2016 | Tourapis et al. |
| 2017/0006283 | A1 | 1/2017 | Zhou et al. |
| 2017/0180737 | A1* | 6/2017 | Ye .......................... H04N 19/70 |

FOREIGN PATENT DOCUMENTS

| | | |
|---|---|---|
| CN | 103460699 | 12/2013 |
| CN | 103716628 | 4/2014 |
| CN | 103733627 | 4/2014 |
| EP | 2693750 | 2/2014 |
| EP | 2725797 | 4/2014 |
| WO | WO 2012/175196 | 12/2012 |
| WO | WO 2013/034649 | 3/2013 |
| WO | WO 2013/055923 | 4/2013 |
| WO | WO 2013/064661 | 5/2013 |
| WO | WO 2013/067318 | 5/2013 |
| WO | WO 2013/109360 | 7/2013 |
| WO | WO 2014/005305 | 1/2014 |
| WO | WO 2014/008109 | 1/2014 |

OTHER PUBLICATIONS

Supplementary European Search Report dated Apr. 25, 2017, from European Patent Application No. 14890721.5, 6 pp.

Choi et al., "Exploration of Practical HEVC/H.265 Sample Adaptive Offset Encoding Policies," *IEEE Signal Processing Letters*, vol. 22, No. 4, pp., pp. 465-468 (Apr. 2015).

International Preliminary Report on Patentability dated Nov. 10, 2016, from International Patent Application No. PCT/CN2014/076446, 7 pp.

Joo et al., "Fast Sample Adaptive Offset Encoding Algorithm for HEVC based on Intra Prediction Mode," *IEEE Int'l Conf. on Consumer Electronics*, pp. 50-53 (Sep. 2013).

Laroche et al., "Non-CE1: Encoder modification for SAO interleaving mode," JCTVC-I0184, 4 pp. (Apr. 2012).

Laroche et al., "JCTVC-H0184 Non-CE1: Encoder modeification for SAO interleaving mode," PowerPoint presentation slides, 6 pp. (Apr. 2012).

Codecian Co. Ltd., "CodecVisa User Guide, Version 4.10," 14 pp. (document downloaded Feb. 2014).

Fu et al., "Sample Adaptive Offset in the HEVC Standard," *IEEE Trans. on Circuits and Systems for Video Technology*, vol. 22, No. 12, pp. 1755-1764 (Dec. 2012).

Hsu e al., "Fast Coding Unit Decision Algorithm for HEVC," *Proc. of IEEE Signal and Information Processing Association Annual Summit and Conference*, 5 pp. (Nov. 2013).

International Search Report and Written Opinion dated Jan. 30, 2015, from International Patent Application No. PCT/CN2014/076446, 13 pp.

Sullivan et al., "Overview of the High Efficiency Video Coding (HEVC) Standard," *IEEE Trans. on Circuits and Systems for Video Technology*, vol. 22, No. 12, pp. 1649-1668 (Dec. 2012).

Sullivan et al., "Standardized Extensions of High Efficiency Video Coding (HEVC)," *IEEE Journal of Selected Topics in Signal Processing*, vol. 7, No. 6, pp. 1001-1016 (Dec. 2013).

Sze et al., "Design and Implementation of Next Generation Video Coding Systems (H.265/HEVC Tutorial)", Powerpoint presentation, *Proc. of IEEE Int'l Symp. on Circuits and Systems*, 131 pp. (Jun. 2014).

Tian, "Research on Computational Complexity Optimization for Intra and Inter Prediction in Video Compression," Waseda University Doctoral Dissertation, 128 pp. (May 2013).

Zhu et al., "A Combined SAO and De-Blocking Filter Architecture for HEVC Video Decoder," *IEEE Int'l Conf. on Image Processing*, pp. 1967-1971 (Sep. 2013).

Supplementary Partial European Search Report dated Jan. 19, 2017, from European Patent Application No. 14890721.5, 7 pp.

Notice on the First Office Action dated Jan. 17, 2018, from Chinese Patent Application No. 201480041989.9, 14 pp.

Notice on the Second Office Action dated Sep. 30, 2018, from Chinese Patent Application No. 201480041989.9, 11 pp.

Final Office Action dated Jan. 17, 2018, from U.S. Appl. No. 14/788,416, 11 pp.

International Preliminary Report on Patentability dated Oct. 20, 2017, from International Patent Application No. PCT/US2016/039701, 16 pp.

International Search Report and Written Opinion dated Nov. 18, 2016, from International Patent Application No. PCT/US2016/039701, 24 pp.

Invitation to Pay Additional Fees and Partial International Search Report dated Aug. 25, 2016, from International Patent Application No. PCT/US2016/039701, 6 pp.

Office Action dated Jul. 28, 2017, from U.S. Appl. No. 14/788,416, 10 pp.

Office Action dated Jul. 27, 2018, from U.S. Appl. No. 14/788,416, 16 pp.

Written Opinion of the International Preliminary Examining Authority dated May 31, 2017, from International Patent Application No. PCT/US2016/039701, 15 pp.

* cited by examiner software 180 implementing one or more innovations
for encoder-side decisions for SAO filtering

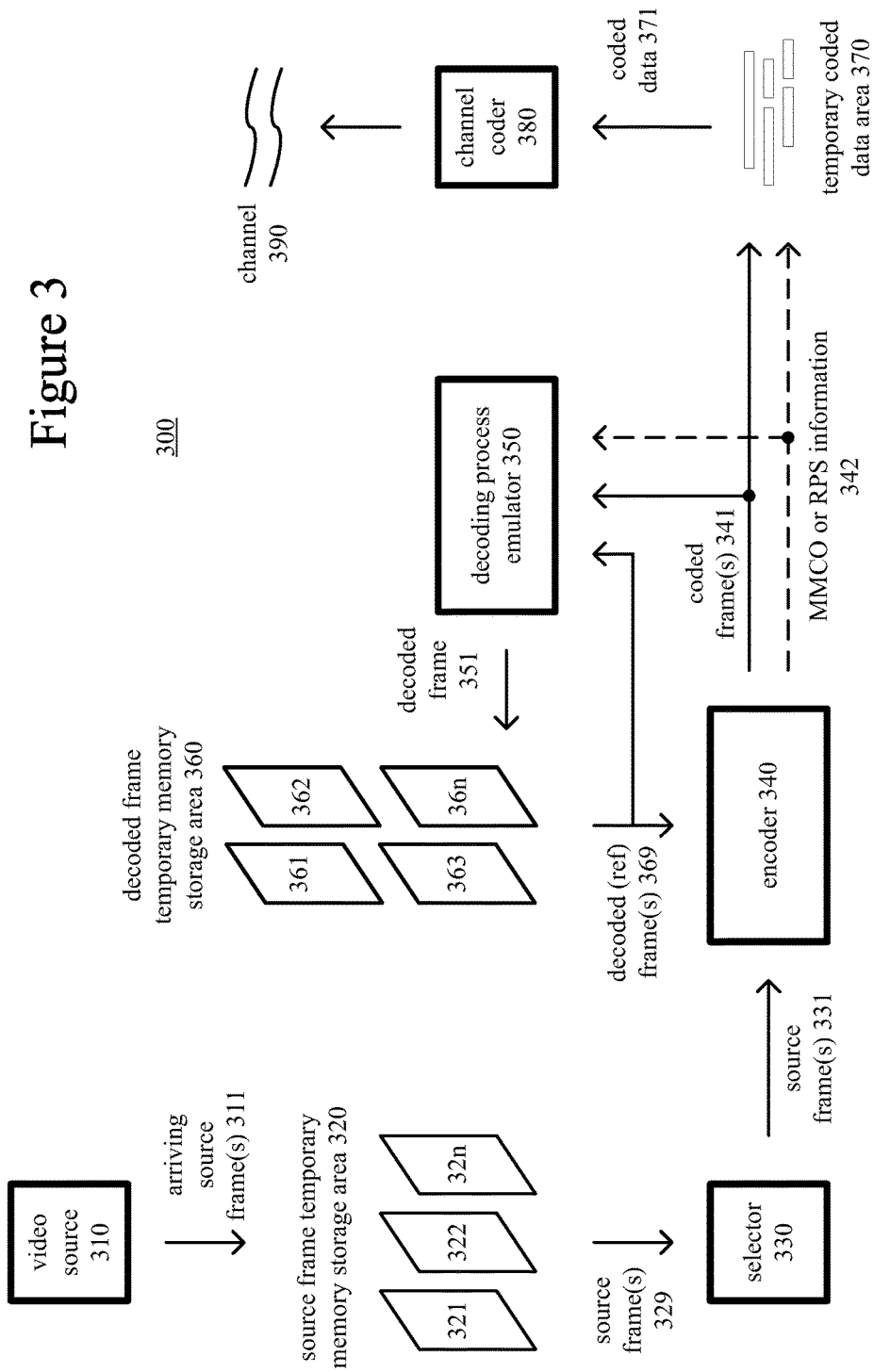

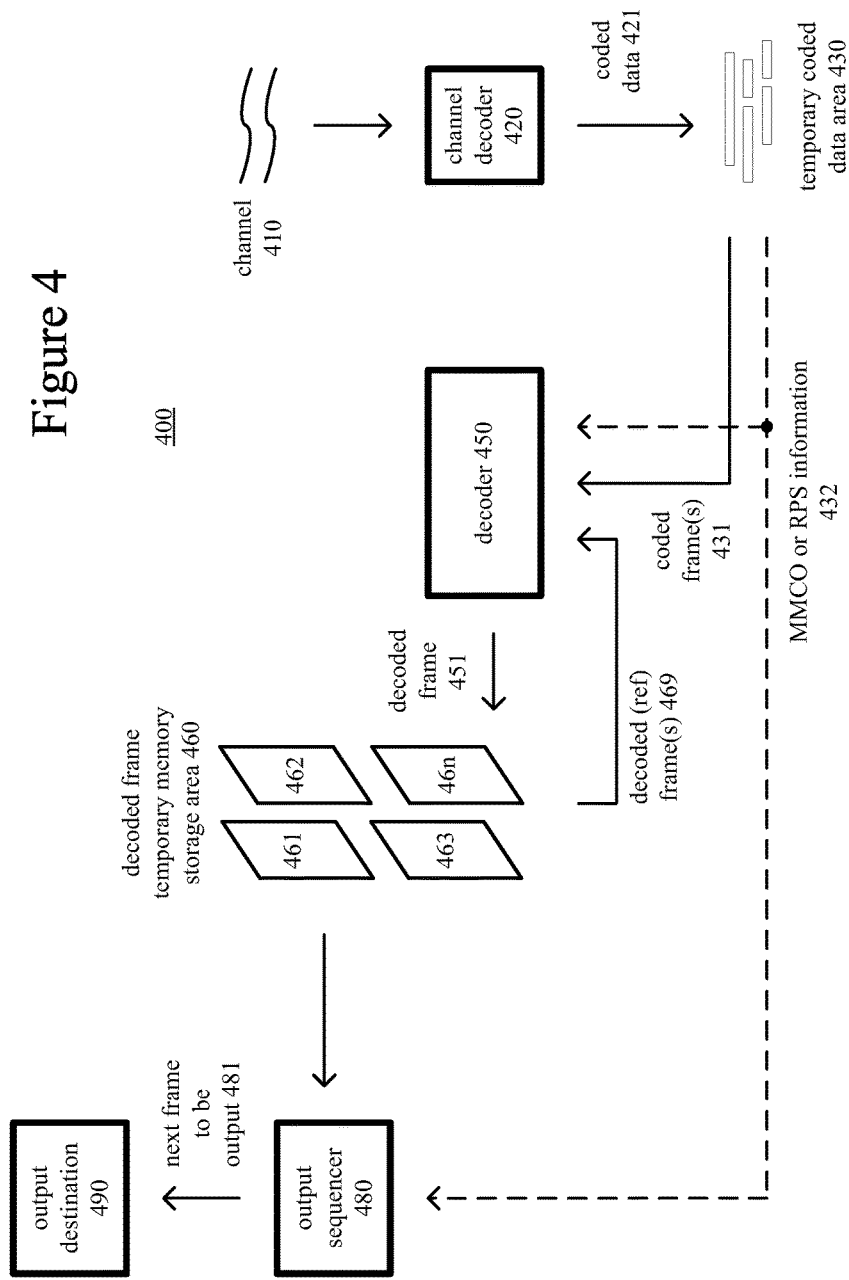

500

600

710
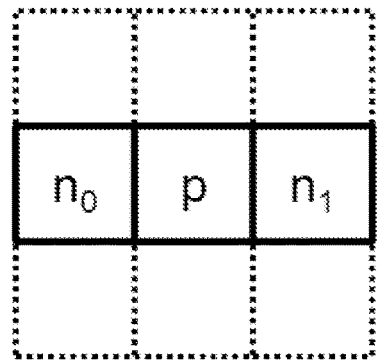
712
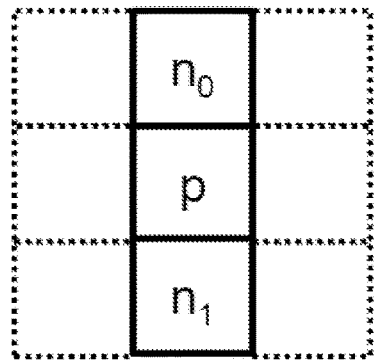
Figure 7(a)
Figure 7(b)
714
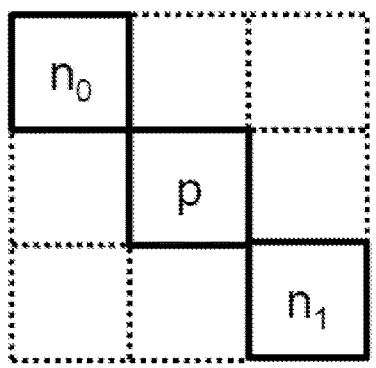
716
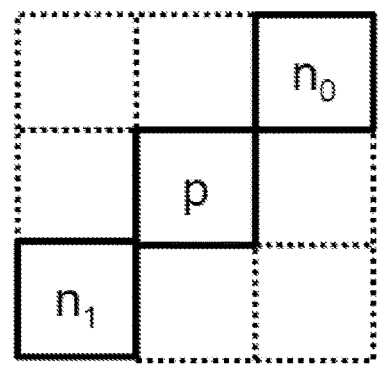
Figure 7(c)
Figure 7(d)

Figure 8
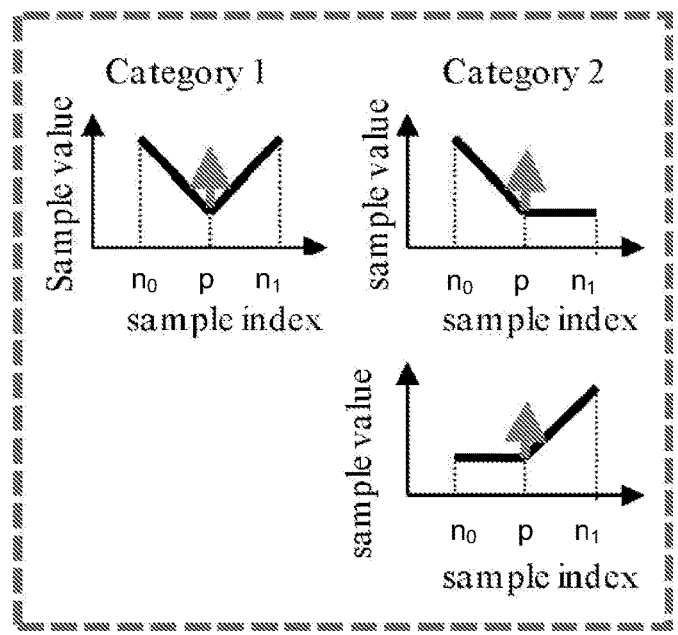
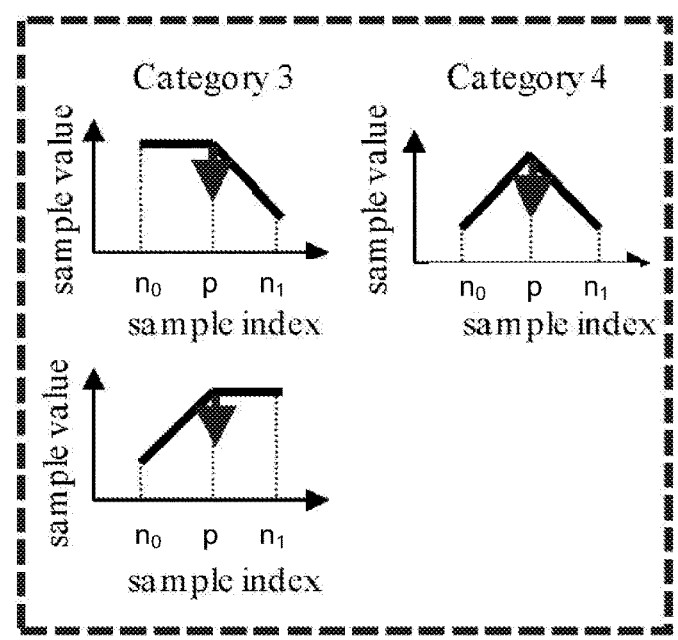

ENCODER-SIDE DECISIONS FOR SAMPLE ADAPTIVE OFFSET FILTERING

CROSS REFERENCE TO RELATED APPLICATIONS

This is the U.S. National Stage of International Application No. PCT/CN2014/076446, filed Apr. 29, 2014, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

During decoding, a video codec can apply one or more filters to reduce the difference between the reconstructed pixels and the original pixels. For example, for the H.265/HEVC standard, two processing steps—a deblocking filter (DBF) followed by a sample adaptive offset (SAO) operation—are available for application to the reconstructed samples before writing them into the decoded picture buffer in the decoder loop. The deblocking filter is intended to reduce the blocking artifacts due to block-based coding. The H.265/HEVC deblocking filter is similar to the deblocking filter of the H.264/MPEG-4 AVC standard, whereas the SAO filter is newly introduced in the H.265/HEVC standard. The deblocking filter is only applied to the samples located at block boundaries. By contrast, the SAO filtering operation is applied adaptively to all samples satisfying certain conditions, such as gradient.

Whether the SAO filtering operation is performed for a reconstructed picture can be controlled by a syntax element (sample_adaptive_offset_enabled_flag) that is part of a given sequence parameter set More specifically, sample_adaptive_offset_enabled_flag equal to 1 specifies that the sample adaptive offset process is applied to the reconstructed picture after the deblocking filter process, whereas sample_adaptive_offset_enabled_flag equal to 0 specifies that the sample adaptive offset process is not applied to the reconstructed picture after the deblocking filter process. If sample adaptive offset filtering is specified to be applied, additional flags are used to separately indicate whether SAO filtering is enabled for picture portions at a smaller level of granularity as well as for luma components and chroma components. This additional signaling can be performed, for instance, on a slice-by-slice basis using the slice_sao_luma_flag and the slice_sao_chroma_flag. Specifically, slice_sao_luma_flag equal to 1 specifies that SAO is enabled for the luma component in the current slice; slice_sao_luma_flag equal to 0 specifies that SAO is disabled for the luma component in the current slice. When the slice_sao_luma_flag is not present, it is inferred to be equal to 0. Further, slice_sao_chroma_flag equal to 1 specifies that SAO is enabled for the chroma component in the current slice; slice_sao_chroma_flag equal to 0 specifies that SAO is disabled for the chroma component in the current slice. When the slice_sao_chroma_flag is not present, it is inferred to be equal to 0. Still further, SAO filtering can be specified at the coding-tree-unit (CTU) level as well. For example, the sao_type_idx_luma and sao_type_idx_chroma syntax elements can be used to enable (or disable) SAO filtering and select the type of SAO filtering to perform for a given CTU. Specifically, for either luma or chrominance CTU, an SAO_type_idx value of 0 indicates that no SAO filtering is enabled, a value of 1 indicates that band-offset-type SAO filtering (BO) is enabled, and a value of 2 indicates that edge-offset-type SAO filtering (EO) is enabled.

The H.265/HEVC standard provides little to no guidance as to when and how SAO filtering should be enabled (e.g., by specifying the sample_adaptive_offset_enabled_flag, the slice_sao_luma_flag, slice_sao_chroma_flag, sao_type_idx_ luma, and/or sao_type_idx_chroma syntax elements) or how and when associated SAO parameters should be set (e.g., by specifying the sao_offset_abs, sao_offset_sign, sao_ band_position, sao_eo_class_luma, sao_eo_class_ chroma, and/or SaoOffsetVal syntax elements). On the other hand, the use of SAO filtering can adversely affect the computational efficiency and processing time for encoding and decoding operations. Accordingly, there are many conditions and situations where SAO is desirably not enabled. This application discloses several approaches for determining when and how to enable SAO filtering operations.

SUMMARY

In summary, the detailed description presents innovations in the area of encoding pictures or portions of pictures (e.g., slices, coding tree units, or coding units) and determining whether and how certain filtering operation should be performed and specified for performance by the decoder in the bitstream. In particular examples, various implementations for setting the sample adaptive offset (SAO) syntax elements in the H.265/HEVC standard are disclosed. Although these examples concern the H.265/HEVC standard and its SAO filtering process, the disclosed technology is more widely applicable to other video codecs that involve filtering operations (particularly multi-stage filtering operations) as part of their encoding and decoding processes.

In one example embodiment, a multi-stage filtering process is applied to a picture portion currently being encoded. The multi-stage filtering process comprises a deblocking filter and a sample adaptive offset (SAO) process that is applied to post-deblocking pixels of the picture portion. In this embodiment, one or more SAO parameters that control application of the SAO process are specified using one or more pre-deblocking pixels of the picture portion.

In another example embodiment, for a picture portion currently being encoded, a determination is made as to whether to apply a second stage of filtering (e.g., SAO filtering) for a multi-stage filtering process based at least in part on data that is indicative of the amount of residual data for the picture portion resulting from the encoding. For example, the amount of residue may be used or a syntax element that is indicative of the residual but not directly associated with SAO filtering may be used. For example, the syntax element controlling whether a picture portion is to be encoded using a "skip mode" can be used.

In a further example embodiment, for a picture portion currently being encoded, a determination is made as to whether to apply a second stage of filtering (e.g., SAO filtering) for a multi-stage filtering process based at least in part on the encoding efficiency of the video encoder or image encoder. For instance, the processing time or number of processing cycles for encoding the current picture or picture portion can be used as the basis for enabling or disabling SAO filtering. The encoding time or number of processing cycles for previously encoded pictures or picture portions can alternatively or additionally be used.

In still a further example embodiment, for a series of pictures or picture portions being encoded, the second stage of filtering (e.g., SAO filtering) of a multi-stage filtering process is periodically applied. For instance, SAO filtering can be applied every n pictures or picture portions, where n is any integer.

In yet a further example embodiment, an edge-offset (EO) process is applied to a picture portion currently being encoded, including applying an edge filter to the picture portion in order to identify one of multiple available EO classes to use. In particular implementations, each of the multiple available EO classes is associated with a different direction along which pixel values will be evaluated during subsequent EO processing. The subsequent EO processing can comprise, for example, determining whether the pixels in the picture portion along the direction of the identified EO class include a local valley, a local peak, a concave corner, or a convex corner, and thereby determining whether positive offset values or negative offset values are to be applied during EO processing.

The innovations can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 4 is a diagram of an example decoder system in conjunction with which some described embodiments can be implemented.

FIG. 7(a) through 7(d) depict four gradient patterns used in edge-offset-type SAO filtering.

FIG. 8 comprises two diagrams showing how a sample value (sample value p) is altered by a positive and negative offset value for certain edge-offset categories.

DETAILED DESCRIPTION

The detailed description presents innovations in the area of encoding pictures or portions of pictures (e.g., slices, coding tree units, or coding units) and specifying whether and how certain filtering operations should be performed and specified in the bitstream for the decoder. In particular examples, various implementations for setting the sample adaptive offset (SAO) syntax elements in the H.265/HEVC standard are disclosed. Although these examples concern the H.265/HEVC standard and its SAO filter, the disclosed technology is more widely applicable to other video codecs that involve filtering operations (particularly multi-stage filtering processes).

Although operations described herein are in places described as being performed by a video encoder or decoder, in many cases the operations can be performed by another type of media processing tool (e.g., image encoder or decoder).

Some of the innovations described herein are illustrated with reference to syntax elements and operations specific to the H.265/HEVC standard. For example, reference is made to Recommendation ITU-T H.265, "High Efficiency Video Coding", dated April 2013. The innovations described herein can also be implemented for other standards or formats.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
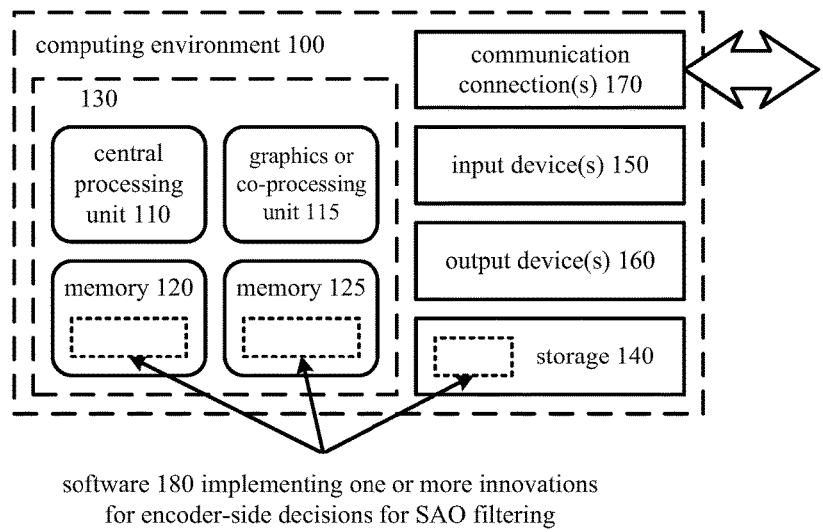
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoder-side decisions for filtering (e.g., SAO filtering), in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be one or more removable or non-removable storage devices, including magnetic disks, solid state drives, flash memories, magnetic tapes or cassettes, CD-ROMs, DVDs, or any other tangible medium which can be used to store information and which can be accessed within the computing system (100). The storage (140) does not encompass propagating carrier waves or signals. The storage (140) stores instructions for the software (180) implementing one or more innovations for encoder-side decisions for filtering (e.g., SAO filtering).

The input device(s) (150) may be a touch input device such as a keyboard, mouse, pen, trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above, but do not encompass propagating carrier waves or signals.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation. Additionally, as used herein, the term "and/or" means any one item or combination of items in the phrase.

II. Example Network Environments.

Figure 2A:
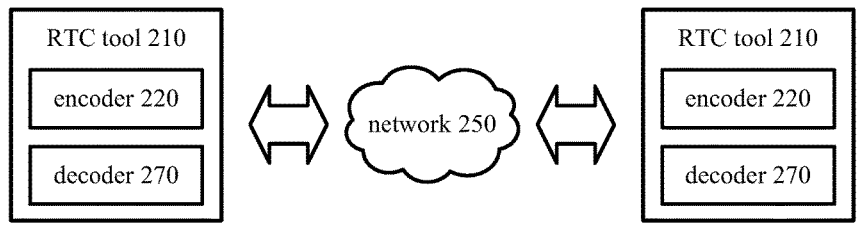
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation, video streaming, video downloading, video broadcasting, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, or a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using SAO filtering and can include one or more flags in the bitstream indicating whether and how to apply SAO filtering, as described herein.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values (or, in some implementations, with respect to original sample values in the frame (331)). An intra-frame prediction reference region is a region of samples in the frame that are used to generate BC-prediction values for the block. The reference region can be indicated with a block vector ("By") value (determined in BV estimation). The reference region can be flipped relative to the prediction region for the block. For intra spatial prediction for a block, the intra-picture estimator estimates extrapolation of the neighboring reconstructed sample values into the block. The intra-picture estimator can output prediction information (such as BV values for intra BC prediction or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples in a current frame. The reference region can be flipped relative to the prediction region for the block. The motion estimator outputs motion information such as motion vector ("MV") information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, index values for BV predictors, BV differentials, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), or combinations of the above. The entropy coder can use different coding techniques for different kinds of information, can apply multiple techniques in combination (e.g., by applying Golomb-Rice coding followed by arithmetic coding), and/or can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample adaptive offset ("SAO") filtering) can alternatively or additionally be applied as in-loop filtering operations. For example, SAO filtering as described herein can be performed and specified for performance during decoding by one or more syntax elements (e.g., the sample_adaptive_offset_enabled_flag, slice_sao_luma_flag, and/or slice_sao_chroma_flag).

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use. The SPS can comprise a syntax element for signaling whether certain types of filtering are performed. For instance, the SPS can include a syntax element (e.g., sample_adaptive_offset_enabled_flag) for specifying that SAO filtering should be performed during decoding.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication or a higher-latency decoding mode for media playback from a file or stream, or it can be a special-purpose decoding tool adapted for one such decoding mode. The decoder system (400) can be adapted for decoding of a particular type of content (e.g., screen capture content). The decoder system (400) can be implemented as an operating system module, as part of an application library or as a standalone application. Overall, the decoder system (400) receives coded data from a channel (410) and produces reconstructed frames as output for an output destination (490). The coded data can include content that has been encoded using SAO filtering and can comprise syntax elements for specifying whether and how SAO filtering should be performed.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An inter-frame reference region can be flipped relative to the prediction region for a block. An intra-frame prediction module can spatially predict sample values of a current block from neighboring, previously reconstructed sample values or, for intra BC prediction, predict sample values of a current block using previously reconstructed sample values of an intra-frame prediction region in the frame. The intra-frame reference region can be indicated with a BV value. The reference region can be flipped relative to the prediction region for a block. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering) can alternatively or additionally be applied as in-loop filtering operations. For example, SAO filtering as described herein can be performed as specified by one or more syntax elements (e.g., the sample_adaptive_offset_enabled_flag, slice_sao_luma_flag, and/or slice_sao_chroma_flag).

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5A:
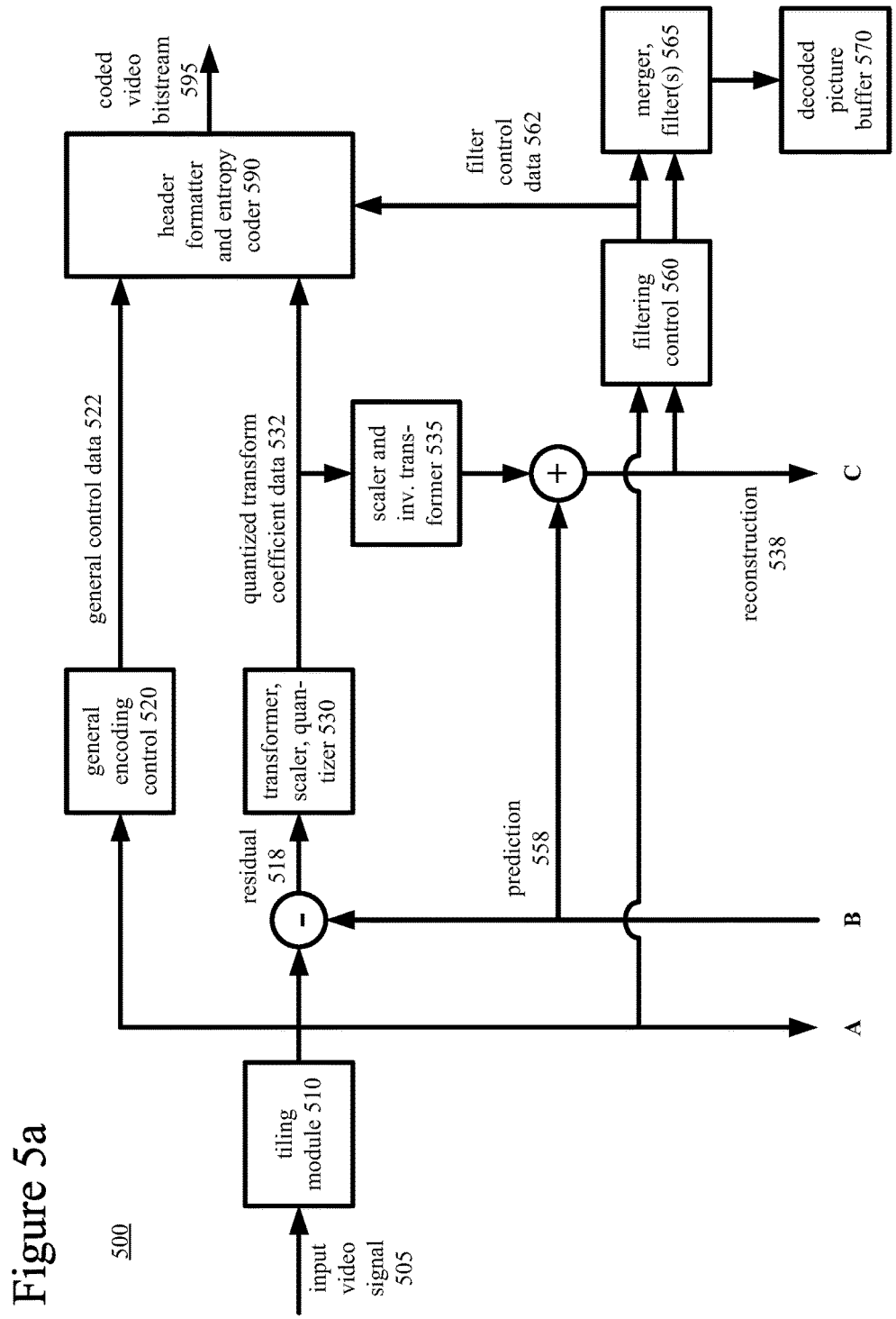
FIGS. 5a and 5b are diagrams illustrating an example video encoder in conjunction with which some described embodiments can be implemented.
Figure 5B:
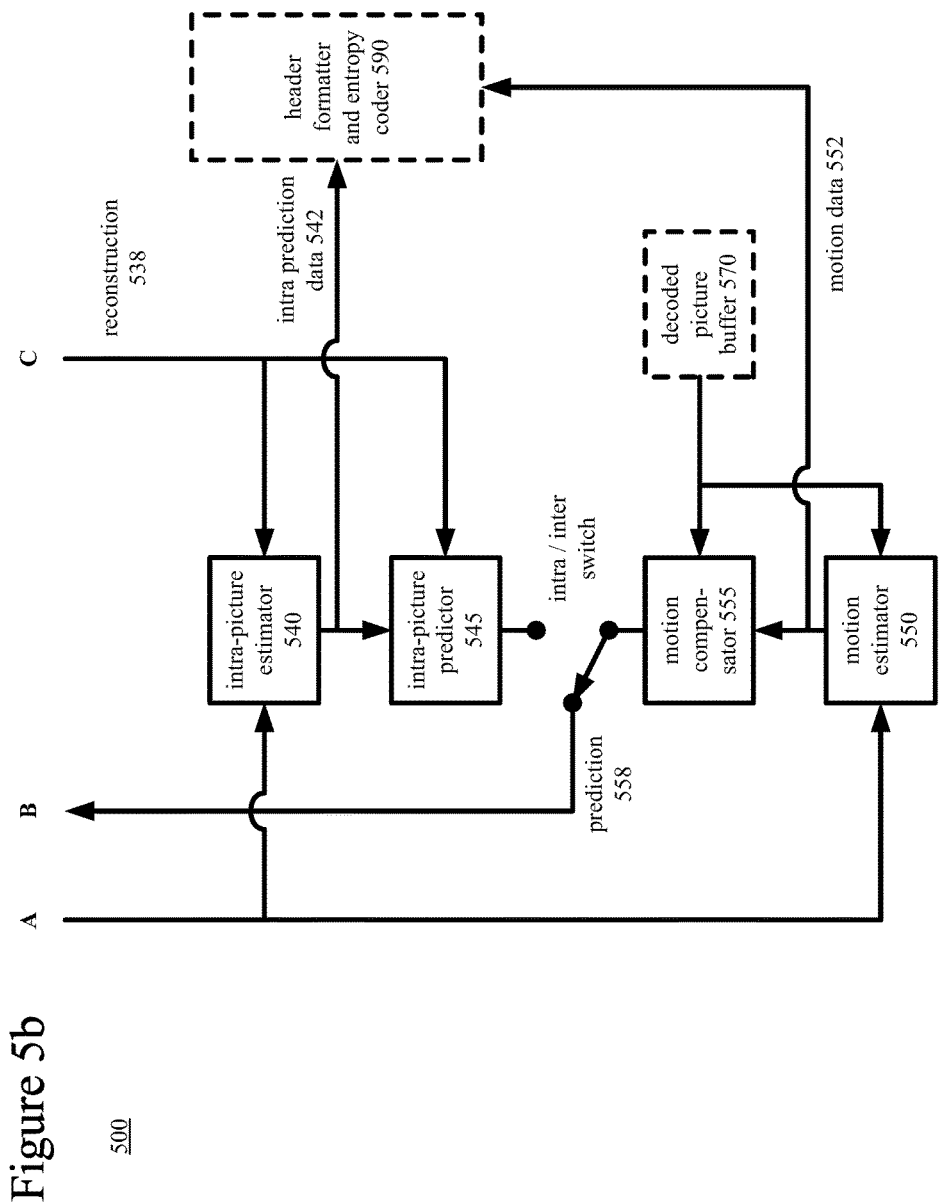

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use aspects of intra BC prediction (e.g., skip mode, block flipping) during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values in the current picture of the input video signal (505) with respect to one or more reference pictures. The motion estimator (550) can evaluate options for flipping a given reference region for an inter-picture coded block, as described below. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, reference picture selection data and whether block flipping is used. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture. When block flipping is used, the motion compensator (555) can account for flipping for a prediction region (for a current block) relative to its reference region.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block in the current picture from neighboring, previously reconstructed sample values of the current picture. Or, for intra BC prediction using BV values, the intra-picture estimator (540) estimates displacement of the sample values of the current block to different candidate reference regions within the current picture. The candidate reference regions can include reconstructed sample values or, in some implementations for purposes of BV estimation, original sample values from the input video. The intra-picture estimator (540) can evaluate different options for flipping of an intra BC prediction region (for a current block) relative to the respective candidate reference regions, as described below.

The intra-picture estimator (540) produces as side information intra prediction data (542), such as information indicating whether intra prediction uses spatial prediction or intra BC prediction, prediction mode direction (for intra spatial prediction), BV values (for intra BC prediction) and whether block flipping is used (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block in the current picture from neighboring, previously reconstructed sample values of the current picture. Or, for intra BC prediction, the intra-picture predictor (545) predicts the sample values of the current block using previously reconstructed sample values of an intra-frame prediction reference region, which is indicated by a BV value for the current block. For intra BC prediction, the intra-picture predictor (545) can account for flipping for an intra BC prediction region (for a current block) relative to its reference region, as described below. In some cases, the BV value can be a BV predictor (predicted BV value). In other cases, the BV value can be different than its predicted BV value. When the chroma data for a picture has the same resolution as the luma data (e.g. when the format is YUV 4:4:4 format or RGB 4:4:4 format), the BV value that is applied for the chroma block may be the same as the BV value applied for the luma block. On the other hand, when the chroma data for a picture has reduced resolution relative to the luma data (e.g. when the format is YUV 4:2:0 format), the BV value that is applied for the chroma block may be scaled down and possibly rounded to adjust for the difference in chroma resolution (e.g. by dividing the vertical and horizontal components of the BV value by two and truncating or rounding them to integer values).

The intra/inter switch selects whether the prediction (558) for a given block will be a motion-compensated prediction or intra-picture prediction. The difference (if any) between a block of the prediction (558) and a corresponding part of the original current picture of the input video signal (505) provides values of the residual (518), for a non-skip-mode block. During reconstruction of the current picture, for a non-skip-mode block, reconstructed residual values are combined with the prediction (558) to produce an approximate or exact reconstruction (538) of the original content from the video signal (505). (In lossy compression, some information is lost from the video signal (505).)

In the transformer/scaler/quantizer (530), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a frame-by-frame basis, tile-by-tile basis, slice-by-slice basis, block-by-block basis, frequency-specific basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. For a non-skip-mode block, the encoder (500) combines reconstructed residual values with values of the prediction (558) (e.g., motion-compensated prediction values, intra-picture prediction values) to form the reconstruction (538). For a skip-mode block, the encoder (500) uses the values of the prediction (558) as the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565). The filtering control (560) can apply any of the disclosed SAO filtering decision methods disclosed herein and/or can specify any of the SAO filtering control syntax elements based on any one or more of those methods.

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For the intra prediction data (542), the header formatter/entropy coder (590) can select and entropy code BV predictor index values (for intra BC prediction). The header formatter/entropy coder (590) can also entropy code syntax elements indicating whether block flipping is used for intra BC prediction (or motion compensation). In some cases, the header formatter/entropy coder (590) also determines BV differentials for BV values (relative to BV predictors for the BV values), then entropy codes the BV differentials, e.g., using context-adaptive binary arithmetic coding. In particular, for a skip-mode intra-BC-predicted block, the BV differential is signaled. Further, the header formatter/entropy coder (590) can specify and encode syntax elements for whether and how SAO filtering is used based on any of the disclosed SAO filtering selection schemes.

The header formatter/entropy coder (590) provides the encoded data in the coded video bitstream (595). The format of the coded video bitstream (595) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
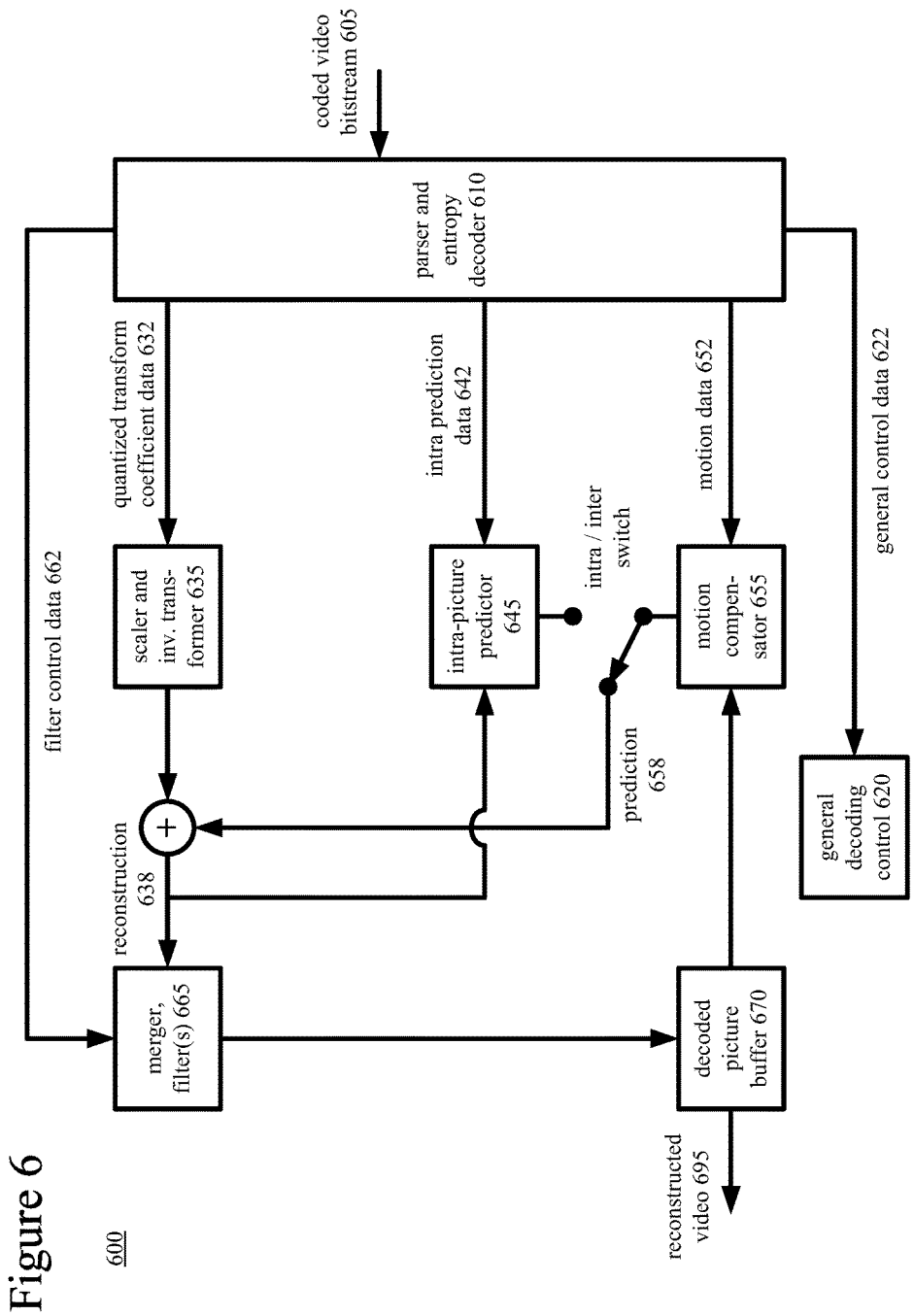
FIG. 6 is a diagram illustrating an example video decoder in conjunction with which some described embodiments can be implemented.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). For the intra prediction data (642), the parser/entropy decoder (610) entropy decodes BV predictor index values (for intra BC prediction). The parser/entropy decoder (610) also entropy decodes syntax elements indicating whether block flipping is used for intra BC prediction (or motion compensation). In some cases, the parser/entropy decoder (610) also entropy decodes BV differentials for BV values (e.g., using context-adaptive binary arithmetic decoding), then combines the BV differentials with corresponding BV predictors to reconstruct the BV values. In particular, for a skip-mode intra-BC-predicted block, a BV differential is parsed from the bitstream and combined with a BV predictor (e.g., indicated with the BV predictor index value) to reconstruct a BV value. Further, the parser/entropy decoder (610) can also decode syntax values from the coded video bitstream (605) indicating whether and how SAO filtering is performed (e.g., using the sample_adaptive_offset_enabled_flag, slice_sao_luma_flag, and/or slice_sao_chroma_flag).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data, merge mode index values and syntax elements indicating whether block flipping is used (for motion compensation). The motion compensator (655) applies MVs to the reconstructed reference picture(s) from the decoded picture buffer (670). When block flipping is used, the motion compensator (655) can account for flipping for a prediction region (for a current block) relative to its reference region. The motion compensator (655) produces motion-compensated predictions for inter-coded blocks in the current picture. The decoded picture buffer (670) stores one or more previously reconstructed pictures for use as reference pictures.

In a separate path within the decoder (600), the intra-frame prediction predictor (645) receives the intra prediction data (642), such as information indicating whether intra prediction uses spatial prediction or intra BC prediction, prediction mode direction (for intra spatial prediction), BV values (for intra BC prediction) and syntax elements indicating whether block flipping is used (for intra BC prediction). For intra spatial prediction, using values of a reconstruction (638) of the current picture, according to prediction mode data, the intra-picture predictor (645) spatially predicts sample values of a current block in the current picture from neighboring, previously reconstructed sample values of the current picture. Or, for intra BC prediction using BV values, the intra-picture predictor (645) predicts the sample values of the current block using previously reconstructed sample values of an intra-frame prediction reference region, which is indicated by a BV value for the current block. For intra BC prediction, the intra-picture predictor (645) can account for flipping for an intra BC prediction region (for a current block) relative to its reference region.

The intra/inter switch selects whether the prediction (658) for a given block is a motion-compensated prediction or intra-picture prediction. For example, when H.265/HEVC syntax is followed, the intra/inter switch can be controlled based on one or more syntax elements encoded for a CU in a picture that can contain intra-predicted CUs and inter-predicted CUs. For a non-skip-mode block, the decoder (600) combines the prediction (658) with reconstructed residual values to produce the reconstruction (638) of the content from the video signal. For a skip-mode block, the decoder (600) uses the values of the prediction (658) as the reconstruction (638).

To reconstruct the residual for a non-skip-mode block, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation so as to adaptively smooth discontinuities across boundaries in the frames. For example, SAO filtering can be selectively applied based on the value of the sample_adaptive_offset_enabled_flag of a sequence parameter set and more specifically applied to either or both of the luminance and chrominance values of a slice based on the values of the slice_sao_luma_flag and the slice_sao_chroma_flag, respectively, as discussed below.

Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter (608) can include de-ringing filtering, adaptive Wiener filtering, film-grain reproduction filtering, SAO filtering or another kind of filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. SAO Filtering

In general, SAO filtering is designed to reduce undesirable visual artifacts, including ringing artifacts that can be compounded with large transformations. SAO filtering is also designed to reduce average sample distortions in a region by first classifying the region samples into multiple categories with a selected classifier, obtaining an offset for each category, and adding the offset to each sample of the category.

SAO filtering modifies the samples after the deblocking filter by applying offset values. SAO can be signaled for application on a sequence parameter set (SPS) basis, on a slice-by-slice basis within a particular SPS, or on a coding-tree-unit basis within a particular slice. The coding tree unit can be a coding tree block (CTB) for luminance values or a coding tree block for chrominance values. For instance, for a given luminance or chrominance CTB, depending on the local gradient at the sample position, certain positive or negative offset values can be applied to the sample.

According to the H.265/HEVC standard, a value of the syntax element sao_type_idx equal to 0 indicates that the SAO is not applied to the region, sao_type_idx equal to 1 signals the use of band-offset-type SAO filtering (BO), and sao_type_idx equal to 2 signals the use of edge-offset-type SAO filtering (EO). In this regard, SAO filtering for luminance values in a CTB are controlled by a first syntax element (sao_type_idx_luma), whereas SAO filtering for chrominance values in a CTB are controlled by a second syntax element (sao_type_idx_chroma).

In the case of edge-offset (EO) mode SAO filtering (specified by sao_type_idx equal to 2), the syntax element sao_eo_class (which has values from 0 to 3) signals whether the horizontal, the vertical, or one of two diagonal gradients is used for EO filtering. FIGS. 7(*a*)-7(*d*) 10 depict the four gradient (or directional) patterns 710, 712, 714, 716 that are used in EO-type SAO filtering. In FIGS. 7(*a*)-7(*d*), the sample labeled "p" indicates a center sample to be considered. The samples labeled "$n_0$" and "$n_1$" specify two neighboring samples along the gradient pattern. Pattern 710 of FIG. 7(*a*) illustrates the horizontal gradient pattern (sao_eo_class=0), pattern 712 of FIG. 7(*b*) illustrates the vertical gradient pattern (sao_eo_class=1), pattern 714 of FIG. 7(*c*) illustrates the 135° diagonal pattern (sao_eo_class=2), and pattern 716 of FIG. 7(*d*) illustrates the 45° diagonal pattern (sao_eo_class=3).

In the edge-offset (EO) mode, once a specific sao_eo_class is chosen for a CTB, all samples in the CTB are classified into one of five EdgeIdx categories by comparing the sample value located at p with two neighboring sample values located at $n_0$ and $n_1$ as shown in Table 1. This edge index classification is done for each sample at both the encoder and the decoder, so no additional signaling for the classification is required. Specifically, when SAO filtering is determined to be performed by the encoder (e.g., according to any of the techniques disclosed) and when EO filtering selected, the classification is performed by the encoder according to the classification rules in Table 1. On the decoder side, when SAO filtering is specified to be performed for a particular sequence, slice, or CTB; and when EO filtering is specified, the classification will also be performed by the decoder according to the classification rules in Table 1. Stated differently, the edge index can be calculated by edgeIndex=2+sign(p−$n_0$)+sign(p−$n_1$), where sign(x) is 1 for x>0, 0 for x=0, and −1 for x<0. When edgeIdx is equal to 0, 1, or 2, edgeIdx is modified as follows: edgeIdx=(edgeIdx==2) ? 0: (edgeIdx+1)

TABLE 1

Sample EdgeIdx Categories in SAO Edge Classes

| EdgeIdx | Condition | Meaning |
| --- | --- | --- |
| 0 | p = $n_0$ and p = $n_1$ or $n_0$ < p < $n_1$ or $n_0$ > p > $n_1$ | flat area |
| 1 | p < $n_0$ and p < $n_1$ | local min (local valley) |
| 2 | p < $n_0$ and p = $n_1$ or p < $n_1$ and p = $n_0$ | edge (concave corner) |
| 3 | p > $n_0$ and p = $n_1$ or p > $n_1$ and p = $n_0$ | edge (convex corner) |
| 4 | p > $n_0$ and p > $n_1$ | local max (local peak) |

For sample categories from 1 to 4, a certain offset value is specified for each category, denoted as the edge offset, which is added to the sample value. Thus, a total of four edge offsets are estimated by the encoder and transmitted to the decoder for each CTB for edge-offset (EO) filtering.

To reduce the bit overhead for transmitting the four edge offsets which are originally signed values, HEVC/H.265 specifies positive offset values for the categories 1 and 2 and negative offset values for the categories 3 and 4, since these cover most relevant cases. FIG. 8 comprises diagram 810 showing how a sample value (sample value p) is altered by a positive offset value for categories 1 and 2, and diagram 812 showing how a sample value (sample value p) is altered by a negative offset value for categories 3 and 4.

In the banding-offset (BO) mode SAO filtering (specified by sao_type_idx equal to 1), the selected offset value depends directly on the sample amplitude. The whole relevant sample amplitude range is split into 32 bands and the sample values belonging to four consecutive bands are modified by adding the values denoted as band offsets. The main reason of the use of four consecutive bands lies in the fact that flat areas where banding artifacts could appear, most sample amplitudes in a CTB tend to be concentrated in only few bands. In addition, this design choice is unified with the edge offset types which also use four offset values. For the banding offset (BO), the pixels are firstly classified by the pixel value. The band index is calculated by bandIndex=p>>(bitdepth-5), where p is the pixel value and the bitdepth is the bit depth of the pixel. For example, for an 8-bit pixel, a pixel value in [0, 7] has index 0, a pixel value in [8, 15] has index 1, etc. In BO, the pixels belonging to specified band indexes are modified by adding a signaled offset.

For edge offset (EO) filtering, the best gradient (or directional) pattern and four corresponding offsets to be used are determined by the encoder. For band offset (BO) filtering, the starting position of the bands is also determined by the encoder. The parameters can be explicitly encoded or can be inherited from the left CTB or above CTB (in the latter case signaled by a special merge flag).

In summary, SAO is a non-linear filtering operation that allows additional minimization of the reconstruction error in a way that cannot be achieved by linear filters. SAO filtering is specifically configured to enhance edge sharpness. In addition, it has been found that SAO is very efficient to suppress pseudo-edges, referred to as "banding artifacts", as well as "ringing artifacts" coming from the quantization errors of high-frequency components in the transform domain.

VIII. Exemplary Methods for Encoder-Side Decisions for SAO Filtering

Disclosed below are example methods that can be performed by an encoder to determine whether and how to perform SAO filtering. The methods can be used, for example, as part of a process for determining what the value of sample_adaptive_offset_enabled_flag should be for a sequence parameter set; what the values of the slice_sao_luma_flag and the slice_sao_chroma_flag, respectively, should be for a particular slice; how and when the sao_type_idx_luma and sao_type_idx_chroma syntax elements should be specified for a particular CTU; and how and when the EO- and BO-specific syntax element should be specified for a particular CTU.

The disclosed examples should not be construed as limiting, however, as they can be modified in many ways without departing from the principles of the underlying invention. Also, any of the methods can be used alone or in combination with one or more other SAO determination methods. For instance, any of the disclosed methods can be a contributing, but not sole, factor for the encoder in determining whether and how to apply SAO filtering.

Furthermore, in some instances, the disclosed methods are used as at least part of a process for determining whether to perform SAO filtering but are not necessarily part of the process for determining which type of SAO filtering to perform (EO or BO). In such cases, other techniques can be used to determine whether to specify EO or BO filtering.

A. Using Pixels Before the Deblocking Filter

In SAO, the pixels after application of the deblocking filter are modified by adding a signaled offset. According to certain embodiments of the disclosed technology, one or more SAO parameters (e.g., the SAO type, offsets, and/or some other necessary information) are determined from one or more pixels prior to application of the deblocking filter (e.g., one or more pre-deblocking-filter pixels). Specifically, in particular embodiments of the disclosed technology, pre-deblocking-filter pixels are used for one or more of the SAO filter decisions, including (a) whether SAO filtering is performed (e.g., the value of the sample_adaptive_offset_enabled_flag); (b) whether SAO filtering is performed for luminance values of a particular slice (e.g., the value of the slice_sao_luma_flag); (c) whether SAO filtering is performed for chrominance values of a particular slice (e.g., the value of the slice_sao_chroma_flag); (d) the gradient direction used by SAO (e.g., the value of the sao_eo_class); (e) the edge index indicating an SAO edge class (e.g., the value of edgeidx); (f) the offset values for edge-offset SAO filtering; (g) the offset values for band-offset SAO filtering; and/or (f) any other SAO filtering information specified by the encoder.

The encoder can perform computations for determining any of these SAO filtering decisions and/or SAO parameter specifications using pixels of a picture or picture portion prior to the pixels being filtered by a deblocking filter (e.g., the deblocking filter applied in-loop at (565) of FIG. 5a). The resulting decisions and/or SAO parameter specifications can then be encoded in the bitstream via the corresponding SAO syntax elements. At the decoder, once the pixels after the deblocking filter are available, SAO filtering according to the specified SAO parameters can then be performed.

This embodiment can be particularly useful for encoders that are configured to apply the deblocking filter only to an entire picture, rather than to a picture portion (such as a slice) as the picture is being decoded. For such encoders, it can be computationally efficient and unnecessarily memory intensive to use post-deblocking-filter pixels for SAO parameter decisions. Some video conferencing encoders exhibit this behavior, making it desirable to use at least some pre-deblocking pixels for SAO parameter decisions.

Still further, in some implementations, when an encoder decides the one or more SAO parameters, some of the pixels from after application of the deblocking filter are available while the others are not available. In such cases, the encoder can decide SAO parameters based on a mixture of pixels (e.g., one or more of the pixels are pixels before the deblocking filter is applied, and one or more of the pixels are pixels after the deblocking filter is applied). The SAO parameters determined from the mixture of pre-deblocking and post-deblocking pixels can then be signaled in the bitstream. In particular implementations, when the pixels after application of the deblocking filter are available, they are preferred for the SAO decision; whereas in other embodiments, the pre-deblocking pixels are preferred.

Figure 9:
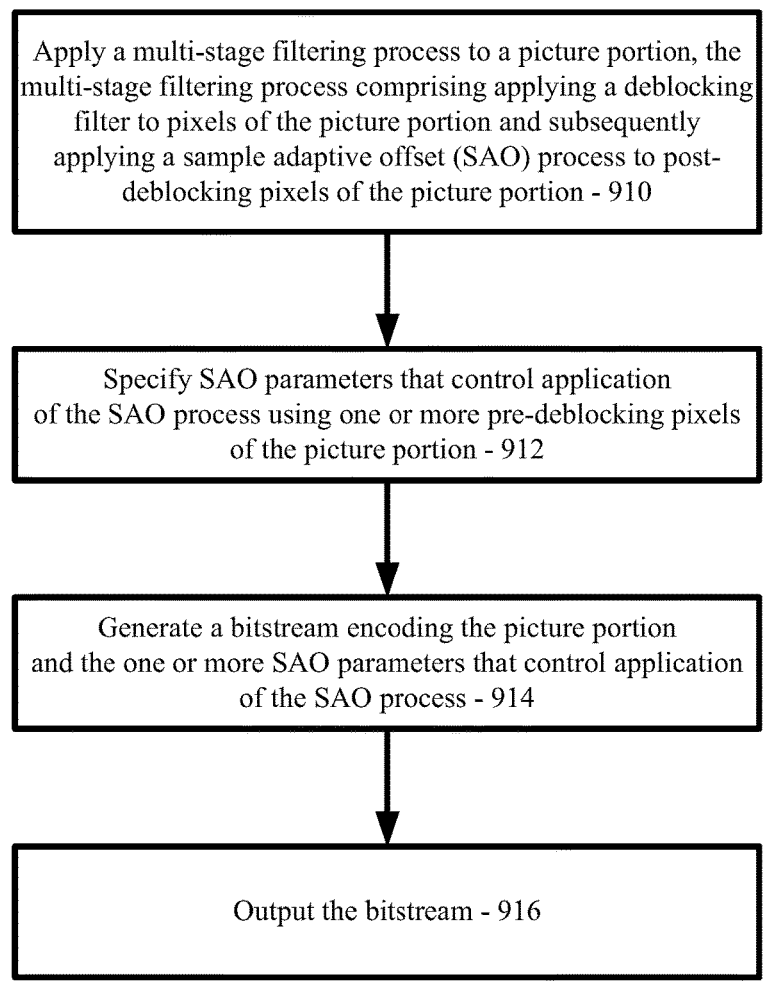
FIG. 9 is a flow chart illustrating an exemplary embodiment for performing SAO filtering according to the disclosed technology.

FIG. 9 is a flow chart (900) illustrating an exemplary embodiment for performing SAO filtering according to this aspect of the disclosed technology. The disclosed embodiment can be performed by a computing device implementing a video encoder or image encoder, which may be further configured to produce a bitstream compliant with the H.265/HEVC standard. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At (910), a multi-stage filtering process is applied to a picture portion currently being encoded, the multi-stage filtering process comprising applying a deblocking filter to pixels of the picture portion and subsequently applying a sample adaptive offset (SAO) process to post-deblocking pixels of the picture portion. At (912), one or more SAO parameters that control application of the SAO process are specified. In this embodiment, one or more pre-deblocking pixels of the picture portion are used in determining the specified SAO parameters. At (914), a bitstream is generated that encodes the picture portion and the one or more SAO parameters that control application of the SAO process. At (916), the bitstream is output.

In certain instances, the sample adaptive offset (SAO) process includes applying an edge offset (EO) technique, and the act of specifying the SAO parameters comprises specifying a SAO parameter that indicates an EO class and SAO parameters that indicate offset values for the EO technique. In such cases, the SAO parameter that indicates an EO class can indicate which one of multiple directional one-dimensional patterns is to be used when applying the EO technique to the picture portion. In other instances, the SAO process includes applying a band offset (BO) technique, and the act of specifying the SAO parameters comprises specifying an SAO parameter that indicates a starting band position for applying offset values and SAO parameters that indicate the offset values for bands to which the BO technique is to be applied. In certain embodiments, the picture portion is a coding tree unit.

B. Using "Skip Mode" or Other Encoder-Side Parameters as a Basis for Determining SAO Parameters In another embodiment, encoder-side parameters that are set during the encoding process but that are not directly related to SAO processing are at least partially used as the basis for deciding whether to perform SAO filtering for a picture, slice, CTU, and/or other picture or picture partition. For instance, in one particular embodiment, the encoder-side decisions for one or more SAO parameters are skipped for coding tree units (CTUs) with "skip mode" signaled. Specifically, if the current CTU being encoded by an encoder is a skip mode CTU (which means that the current CTU just copies the pixels from one or more other pictures), the encoder can skip the SAO decision process for the CTU. Thus, an encoder can simply make the decision that SAO is not applied to a CTU that has been designated as a skip mode CTU.

In one exemplary implementation, the encoder sets the sao_type_idx value to 0 for a CTU when the one or more coding units (CUs) in that CTU are or will be signaled as "skip mode" coding units. Because the skip mode is signaled on a coding unit basis (e.g., using the cu_skip_flag), the encoder may be configured to disable SAO filtering only when all CUs of a current CTU being encoded are "skip mode" CUs. In cases where a CTU only comprises a single CU, this decision can be simplified to just evaluating whether the single CU is a "skip mode" CU. Additionally, this decision-making technique can be extended to the other example embodiments described below. Further, when all luma or chroma CTUs of a slice are "skip mode" CTUs, the slice level SAO flags can be set to disable SAO filtering (e.g., slice_sao_luma_flag and slice_sao_chroma_flag, respectively). Similarly, when all luma or chroma CTUs in inter coded pictures of a sequence are "skip mode" CTUs, the picture level SAO flag can be set to disable SAO filtering (e.g., sample_adaptive_offset_enabled_flag).

In further embodiments, other parameters specified by the encoder can be used as a basis for enabling SAO filtering at the CTU level, slice level, and/or picture level. For example, in one implementation, the flag indicating the prediction mode for a coding unit (e.g., pred_mod_flag) is used. For instance, when the flag indicates that the one or more CUs for a CTU are to be encoded using inter-prediction coding, then SAO filtering can be disabled for the CTU. This is because, generally, the residual for a CTU encoded with inter-prediction coding is less than the residual for the CTU when it is encoded with intra-prediction coding. In another implementation, the flag indicating whether a scaling and transform process and in-loop filtering is to be performed (e.g., cu_transquant_bypass_flag) is used. For instance, when this flag indicates that the scaling and transform process and the in-loop filter process are to be bypassed for the one or more CUs for a CTU, the encoder can automatically disable SAO filtering for the current CTU; or, in some implementations, determine whether the number of CUs with a cu_transquant_bypass_flag equal to 1 in the current CTU exceeds a threshold value and disable SAO filtering for the current CTU based on this determination. In a further implementation, the syntax elements indicating whether luminance or chrominance transform blocks in a CTU or other picture partition have one or more transform coefficients levels not equal to 0 (e.g., cbf_luma, cbf_cb, and cbf_cr) are used. For instance, if these syntax elements indicate that the corresponding luminance or chrominance transform blocks for a CTU have transform coefficients that are all equal to 0, the encoder can specify that SAO filtering be disabled for the corresponding luminance or chrominance values of the CTU. Or, in certain implementations, SAO filtering can be disabled if the number of transform blocks for a CTU having non-zero coefficients is less than some threshold value (e.g., any suitable integer value).

In still further embodiments, an encoder can make the decision that SAO is not applied to the current CTU using other criteria. For example, an encoder can decide not to apply SAO on the current CTU if there is no residual signaled for the current CTU. This follows from the fact that if no residual is signaled, then the encoding process for the current CTU encoding can be (or has been) performed with little to no loss of resolution, making further filtering unnecessary. The absence of a residual can be experienced in many situations encountered by an encoder, including situations where there is a stationary picture with little to no movement, or when there are large areas of similar pixels. Similarly, the encoder can decide not to apply SAO on the current CTU if the residual signaled for the current CTU is beneath some threshold value (e.g., any suitable value selected to balance visual quality with performance).

In still further embodiments, the encoder can make the decision to enable or disable SAO based on a combination of criteria. For instance, multiple criteria may be evaluated, any one of which can be sufficient to trigger the encoder to enable or disable SAO filtering. Or, in some cases, multiple criteria can be evaluated, all of which must be satisfied to trigger the encoder to enable or disable SAO filtering. Still further, some combination of these may be used to determine when to enable or disable SAO filtering (e.g., disable SAO filtering if (criteria A AND criteria B) OR criteria C).

Figure 10:
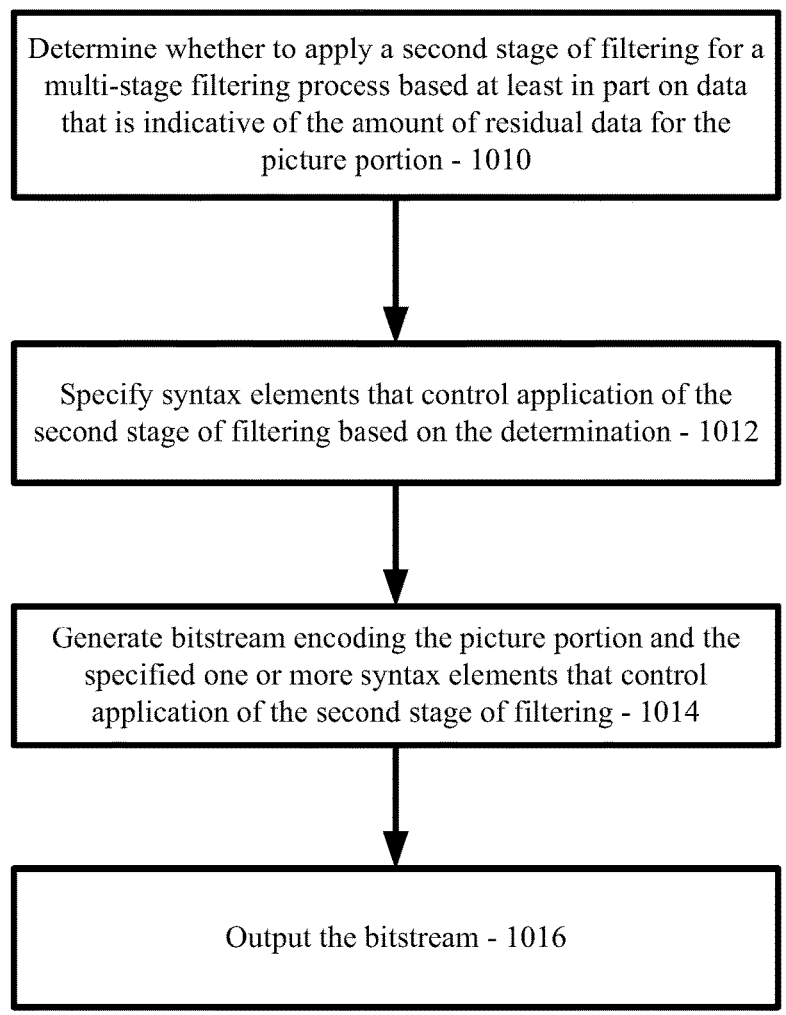
FIG. 10 is a flow chart illustrating an exemplary embodiment for determining when to apply a second stage of filtering (such as SAO filtering) according to the disclosed technology.

FIG. 10 is a flow chart (1000) illustrating an exemplary embodiment for determining when to apply a second stage of filtering (such as SAO filtering) according to this aspect of the disclosed technology. The disclosed embodiment can be performed by a computing device implementing a video encoder or image encoder, which may be further configured to produce a bitstream compliant with the H.265/HEVC standard. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At (1010), for a picture portion currently being encoded, a determination is made as to whether to apply a second stage of filtering for a multi-stage filtering process based at least in part on data that is indicative of the amount of residual data for the picture portion resulting from the encoding. At (1012), one or more syntax elements that control application of the second stage of filtering are specified based on the determining. At (1014), a bitstream is generated that encodes the picture portion and the specified one or more syntax elements that control application of the second stage of filtering. At (1016), the bitstream is output.

The second stage of the multi-stage filtering process can comprise sample adaptive offset (SAO) filtering, and the first stage can comprise a deblocking filter. Further, the picture portion that is encoded can be any one of a slice, coding tree unit, coding unit, or other suitable picture portion.

The act of determining whether to apply a second stage of filtering can comprise determining to disable the second stage of filtering only if the data that is indicative of the amount of residual data indicates that there is no residual data for the picture portion resulting from the encoding. The act of determining whether to apply a second stage of filtering can alternatively comprise determining to disable the second stage of filtering only if the data that is indicative of the amount of residual data indicates that the amount of residual data is less than a threshold value.

The data that is indicative of the amount of residual data for the picture portion can comprise a syntax element that is indicative of the amount of residual data but that does not itself control the second stage of filtering. For instance, the syntax element that is indicative of the amount of residual data can be a syntax element indicating that a skip mode is to be applied to the picture portion. Further, in such cases, the determining can comprise determining to disable the second stage of filtering if the skip mode is to be applied to the picture portion. Still further, the syntax element that is indicative of the amount of residual data can comprise one of: (a) a syntax element that indicates a prediction mode for the picture portion; (b) a syntax element that indicates whether transform coefficients in the picture portion are not equal to zero; or (c) a syntax element indicating that scaling and transform for the picture portion are to be bypassed.

When second stage filtering is to be applied, the method can further comprise determining one or more parameters associated with the application of the second stage of filtering using at least some pixel values for the picture portion prior to application of the first stage of filtering. In some implementations, one or more post-deblocking pixel values are also used.

Further, in some instances, the second stage filtering can comprise an edge offset filtering process, and the method can further comprise, when second stage filtering is to be applied, applying an edge filter to determine an edge direction in the picture portion (as discussed below), thereby avoiding individual application of multiple gradient patterns that are specified for use with edge offset filtering.

C. Adaptive Techniques for Applying SAO Filtering

In other encoder embodiments, the encoder is configured to adaptively enable or disable SAO filtering for different pictures. For instance, in one exemplary encoder implementation, encoding efficiency (e.g., encoding speed) may be used as a basis for determining whether to signal SAO filtering for a CTU, slice, picture, or other picture portion. As an example, an encoder can be configured to monitor its encoding efficiency (e.g., as a measure of processing time or processing cycles); when the processing time for a current CTU, slice, picture, or other picture portion being encoded drops below a minimum threshold, the encoder can decide to disable SAO filtering for that CTU, slice, picture, or picture portion. Thus, when the encoder finds that it has already cost too much time before deciding SAO parameters, it can simply skip the SAO decision process for the current CTU, slice, picture, or picture portion.

Figure 11:
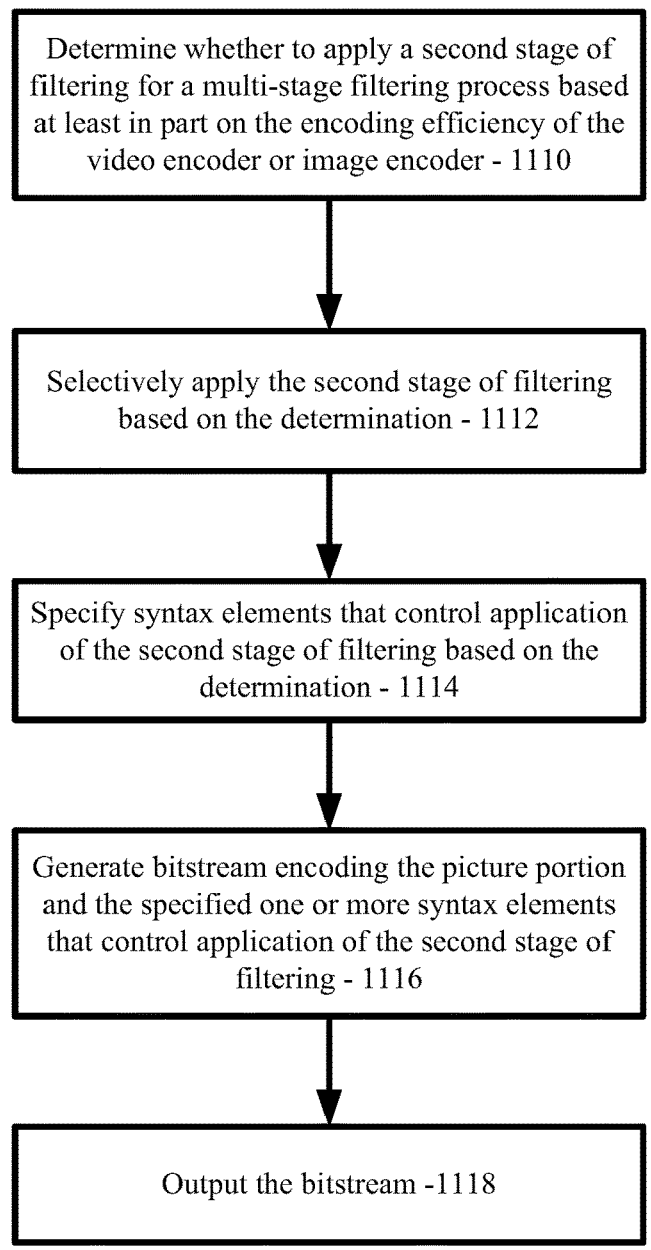
FIG. 11 is a flow chart illustrating another exemplary embodiment for determining whether to apply a second stage of filtering for a multi-stage filtering process according to the disclosed technology.

FIG. 11 is a flow chart (1100) illustrating an exemplary embodiment for determining whether to apply a second stage of filtering for a multi-stage filtering process according to this aspect of the disclosed technology. The disclosed embodiment can be performed by a computing device implementing a video encoder or image encoder, which may be further configured to produce a bitstream compliant with the H.265/HEVC standard. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At (1110), for a picture portion currently being encoded, a determination is made as to whether to apply a second stage of filtering for a multi-stage filtering process based at least in part on the encoding efficiency of the video encoder or image encoder. At (1112), the second stage of filtering is selectively applied based on the determination. At (1114), one or more syntax elements that control application of the second stage of filtering are specified based on the determination. At (1116), a bitstream encoding the picture portion and the specified one or more syntax elements that control application of the second stage of filtering is generated. At (1118), the bitstream is output.

The second stage of the multi-stage filtering process can comprise a sample adaptive offset (SAO) filter, and the first stage can comprise a deblocking filter. Further, the picture portion encoded can be a coding tree unit.

The encoding efficiency can be measured by the processor time in encoding the picture portion currently being encoded. For instance, in such cases, the determining can be performed by comparing the processor time to a threshold value and determining to disable the second stage of filtering if the processor time exceeds the threshold value. The encoding efficiency can alternatively be measured by the number of processor cycles used in encoding the picture portion currently being encoded. In such cases, the determining can be performed by comparing the number of processor cycles to a threshold value and determining to disable the second stage of filtering if the number of processor cycles exceeds the threshold value. Still further, in some embodiments, the encoding efficiency is measured by the processor time or number of processor cycles used in encoding one or more previously encoded picture portions.

D. Periodic SAO Filtering

In other encoder embodiments, an encoder can signal for SAO filtering and apply the SAO parameter determination process periodically. For example, in one implementation, an encoder can be configured to enable SAO filtering and apply the SAO parameter determination process every n pictures, where n can be any integer value (e.g., n=2, 3, 4, 5, 6, 7, 8, or any other integer value). If n is set to 4, for instance, this means that the encoder can apply SAO filtering and the SAO parameter determination process on picture 0, and disable SAO filtering for pictures 1, 2, and 3; and then enable SAO filtering and apply the SAO parameter determination process on picture 4.

This periodic SAO filtering approach can also be adapted at finer levels of granularity. For instance, an encoder can be configured to enable SAO filtering and to apply the SAO parameter determination process periodically for slices in a picture, or for CTUs in a picture. For instance, the encoder can be configured to enable SAO filtering every n slices, or every n CTUs, where n is any integer value as described above.

Still further, in certain embodiments, the periodic application of SAO filtering to regions of a pictures (e.g., to slice and CTU) can be varied regionally so that the same region does not have SAO filtering disabled from picture to picture. For instance, the encoder can be configured so that slice 0 has SAO filtering disabled while slice 1 has SAO filtering enabled for a first picture, and slice 0 has SAO filtering enabled while slice 1 has SAO filtering disabled for a second picture, where the second picture follows consecutively to the first picture. Given the relatively high frame rate of video (e.g., 24 frames-per-second or greater), this balanced approach can produce a visually imperceptible difference in the reconstructed video stream.

Figure 12:
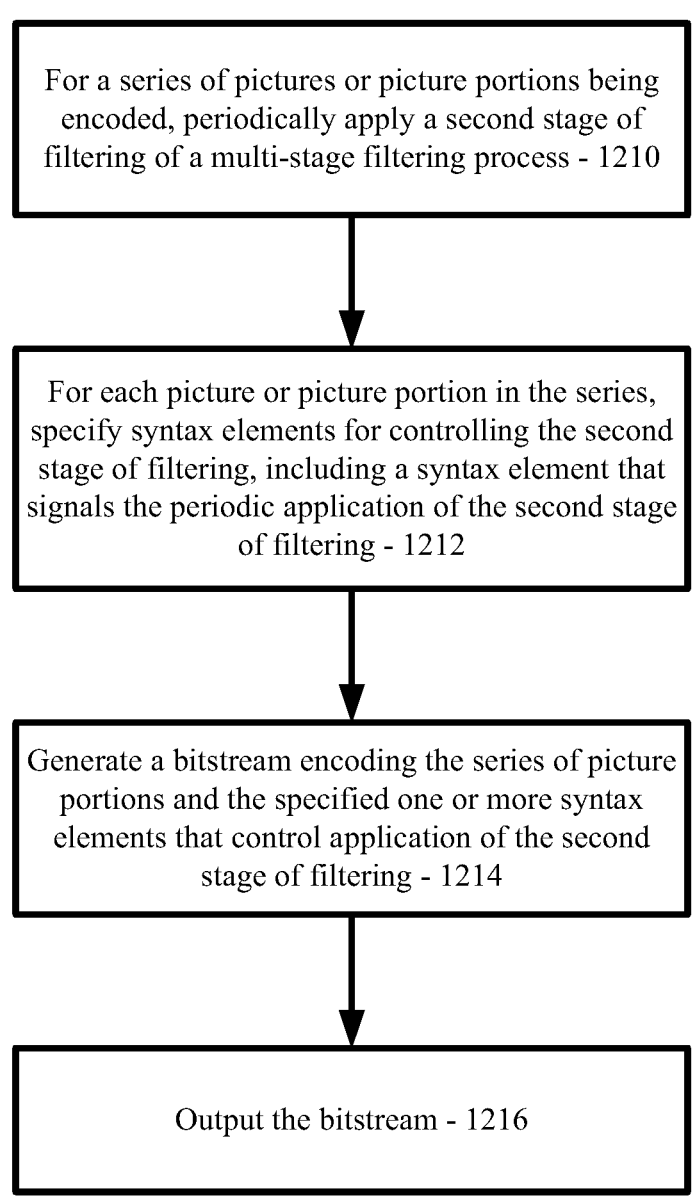
FIG. 12 is a flow chart illustrating another exemplary embodiment for determining whether to apply a second stage of filtering for a multi-stage filtering process according to the disclosed technology.

FIG. 12 is a flow chart 1200 illustrating an exemplary embodiment for determining whether to apply a second stage of filtering for a multi-stage filtering process according to this aspect of the disclosed technology. The disclosed embodiment can be performed by a computing device implementing a video encoder or image encoder, which may be further configured to produce a bitstream compliant with the H.265/HEVC standard. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At (1210), for a series of pictures or picture portions being encoded, the second stage of filtering of a multi-stage filtering process is periodically applied (e.g., according to a fixed period). At (1212), for each picture or picture portion in the series, one or more syntax elements for controlling the second stage of filtering are specified, including a syntax element that signals the periodic application of the second stage of filtering (e.g., the sample_adaptive_offset_enabled_flag, the slice_sao_luma_flag, slice_sao_chroma_flag, sao_type_idx_luma, and/or sao_type_idx_chroma syntax elements, which can be specified periodically as described herein). At (1214), a bitstream encoding the series of picture portions and the specified one or more syntax elements that control application of the second stage of filtering is generated. At (1216), the bitstream is output.

The second stage of the multi-stage filtering process can comprise a sample adaptive offset (SAO) filter, and a first stage can comprise a deblocking filter. Further, the picture portion can be a coding tree unit.

The act of periodically applying the second stage of filtering can comprise applying the second stage of filtering every n pictures or picture portions. As an example, the second stage of filtering can be applied every four pictures. This value has been observed to provide a good tradeoff between coding capacity and performance.

E. Using Edge Detection

In other encoder embodiments, and to increase encoder efficiency (and/or decrease the encoding complexity), edge detection is used to decide the SAO edge direction for EO-type SAO filtering. As disclosed above, there are four types of edge directions in EO-type SAO filtering. An encoder can try all the four possible directions and then select the best one, but this brute-force approach may cost too much encoder time and decrease encoder efficiency. Accordingly, in some implementations, the encoder is configured to select the edge direction by using a pre-analysis process to determine the edge direction without trying each of the four possible direction and then deciding the SAO parameters for the best-matching edge direction. For example, the encoder can select the edge direction by employing an edge filter, such as a Sobel operator, Canny operator, an LoG (Laplacian of Gaussian) filter, a Robert operator, a Prewitt operator, or other edge direction operator. Such an edge direction operator can be used to identify the edge direction (e.g., in a CTU) and to then select the closest available SAO edge direction (e.g., from among the directions illustrated in FIG. 7 and available in the HEVC/H.265 standard). By using an edge detection operator, the encoder can avoid having to separately compute each of the four available directions and selecting the best, and can instead more efficiently and directly identify which of the four directions to select.

Figure 13:
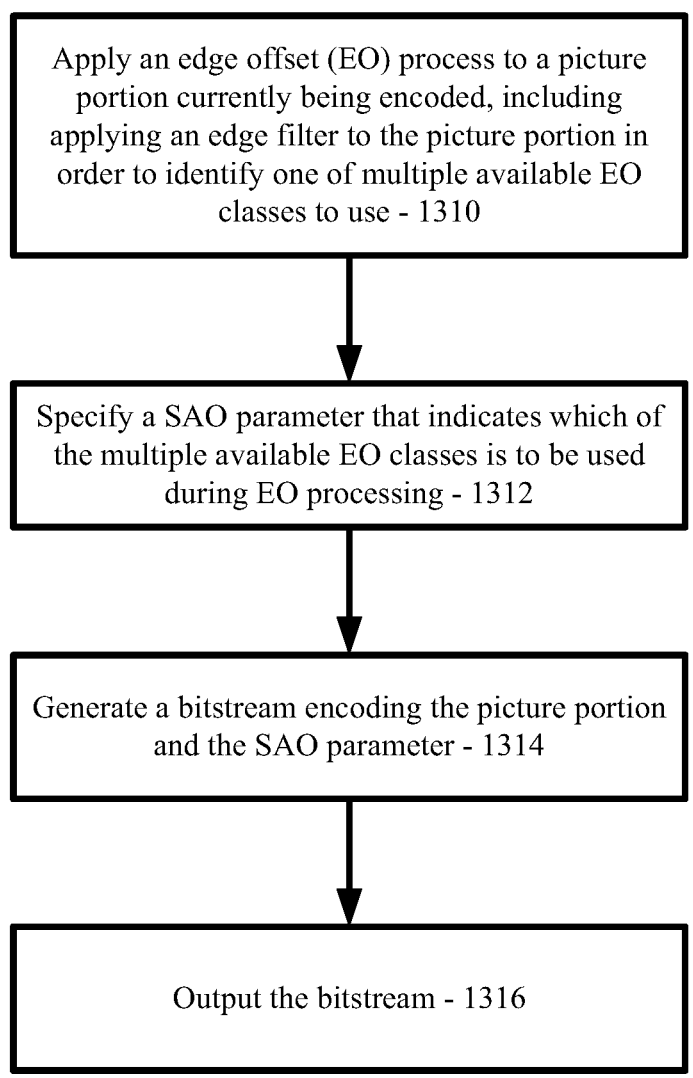
FIG. 13 is a flow chart illustrating an exemplary embodiment for performing an edge offset (EO) process according to the disclosed technology

FIG. 13 is a flow chart 1300 illustrating an exemplary embodiment for performing an edge offset (EO) process according to this aspect of the disclosed technology. The disclosed embodiment can be performed by a computing device implementing a video encoder or image encoder, which may be further configured to produce a bitstream compliant with the H.265/HEVC standard. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At (1310), an edge offset (EO) process is applied to a picture portion currently being encoded, including applying an edge filter to the picture portion in order to identify one of multiple available EO classes to use, each of the multiple available EO classes being associated with a different direction along which pixel values will be evaluated during subsequent EO processing. The subsequent EO processing can comprise, for example, determining whether the pixels in the picture portion along the direction of the identified EO class include a local valley, a local peak, a concave corner, or a convex corner, and thereby determining whether positive offset values or negative offset values are to be applied during EO processing. At (1312), an SAO parameter is specified that indicates which of the multiple available EO classes is to be used during EO processing. At (1314), a bitstream is generated encoding the picture portion and the SAO parameter that indicates which of the multiple available EO classes is to be used for EO processing. At (1316), the bitstream is output.

The picture portion can be a coding tree unit. The SAO parameter that indicates which of the multiple available EO classes is to be used for EO processing can be for luminance values in the picture portion or for chrominance values in the picture portion. In particular implementations, the edge filter comprises a Canny operator, a Sobel operator, or other edge filter for detecting edge direction. In some embodiments, the applying of the EO process omits or skips the separate application of directional patterns associated with each of the multiple available EO classes In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims and their equivalents.

We claim:

1. In a computing device implementing a video encoder or image encoder, a method comprising:

for a picture portion currently being encoded, determining whether to apply a second stage of filtering for a multi-stage filtering process based at least in part on data that is indicative of the amount of residual data for the picture portion resulting from the encoding, wherein the determining comprises determining to disable the second stage of filtering only if the data that is indicative of the amount of residual data indicates that there is no residual data for the picture portion resulting from the encoding, or only if the data that is indicative of the amount of residual data indicates that the amount of residual data is less than a threshold value;

specifying one or more syntax elements that control application of a second stage of filtering based on the determining;

encoding the picture portion in a bitstream, the bitstream including the specified one or more syntax elements that control application of the second stage of filtering; and outputting the bitstream.

2. The method of claim 1, wherein the second stage of the multi-stage filtering process comprises sample adaptive offset (SAO) filtering, wherein a first stage of the multi-stage filtering process comprises applying a deblocking filter, and wherein the picture portion is one of a slice, coding tree unit, or coding unit.

3. The method of claim 1, wherein the data that is indicative of the amount of residual data for the picture portion comprises a syntax element that is indicative of the amount of residual data but that does not itself control the second stage of filtering.

4. The method of claim 3, wherein the syntax element that is indicative of the amount of residual data is a syntax element indicating that a skip mode is to be applied to the picture portion, and wherein the determining comprises determining to disable the second stage of filtering if the skip mode is to be applied to the picture portion.

5. The method of claim 1, further comprising, when second stage filtering is to be applied, determining one or more parameters associated with the application of the second stage of filtering using pixel values for the picture portion prior to application of the first stage of filtering.

6. The method of claim 1, wherein the second stage filtering comprises an edge offset filtering process, and wherein the method further comprises, when second stage filtering is to be applied, applying an edge filter to determine an edge direction in the picture portion, and thereby avoiding individual application of multiple gradient patterns that are specified for use with edge offset filtering.

7. In a computing device implementing a video encoder or image encoder, a method comprising:

applying a multi-stage filtering process to a picture portion currently being encoded, the multi-stage filtering process comprising applying a deblocking filter to pixels of the picture portion and subsequently applying a sample adaptive offset (SAO) process to post-deblocking pixels of the picture portion, the applying of the SAO process being selectively determined based at least in part on data that is indicative of the amount of residual data for the picture portion resulting from the encoding, and after determining whether to disable the SAO process if the data that is indicative of the amount of residual data indicates that there is no residual data for the picture portion resulting from the encoding, or if the data that is indicative of the amount of residual data indicates that the amount of residual data is less than a threshold value;

specifying one or more SAO parameters that control application of the SAO process, wherein the specifying the one or more SAO parameters is performed using pre-deblocking pixels of the picture portion;

generating a bitstream comprising an encoded version of the picture portion and the one or more SAO parameters that control application of the SAO process; and outputting the bitstream.

8. The method of claim 7, wherein the sample adaptive offset (SAO) process includes applying an edge offset (EO) technique, wherein the specifying comprises specifying a SAO parameter that indicates an EO class and SAO parameters that indicate offset values for the EO technique, and wherein the SAO parameter that indicates an EO class indicates which one of multiple directional one-dimensional patterns is to be used when applying the EO technique to the picture portion.

9. The method of claim 7, wherein the sample adaptive offset (SAO) process includes applying a band offset (BO) technique, and wherein the specifying comprises specifying an SAO parameter that indicates a starting band position for applying offset values and SAO parameters that indicate the offset values for bands to which the BO technique is to be applied.

10. The method of claim 7, wherein the picture portion is a coding tree unit.

11. In a computing device implementing a video encoder or image encoder, a method comprising:

for a series of pictures or picture portions being encoded, periodically applying a second stage of filtering of a multi-stage filtering process, wherein, for a respective picture or picture portion, the periodically applying is determined based at least in part on data that is indicative of the amount of residual data for the respective picture or picture portion, and wherein the second stage of filtering is disabled only if the data that is indicative of the amount of residual data indicates that there is no residual data for the respective picture or picture portion resulting from the encoding, or only if the data that is indicative of the amount of residual data indicates that the amount of residual data is less than a threshold value;

for each picture or picture portion in the series, specifying one or more syntax elements for controlling the second stage of filtering, including a syntax element that signals the periodic application of the second stage;

encoding the series of picture portions in a bitstream, the bitstream further including the specified one or more syntax elements that control application of the second stage of filtering; and outputting the bitstream.

12. The method of claim 11, wherein the periodically applying comprises applying the second stage of filtering every n pictures or picture portions.

13. One or more tangible computer-readable media storing computer-executable instructions for causing a computing device programmed thereby to perform the method of claim 1.

* * * * *